July 31, 1956

L. H. ALBERTSON 2,756,882

HAY STACK LOADER VEHICLE

Filed Oct. 1, 1954

INVENTOR.
LYLE H. ALBERTSON
BY

McMorrow, Berman + Davidson
ATTORNEYS

July 31, 1956
L. H. ALBERTSON
2,756,882
HAY STACK LOADER VEHICLE
Filed Oct. 1, 1954
2 Sheets-Sheet 2
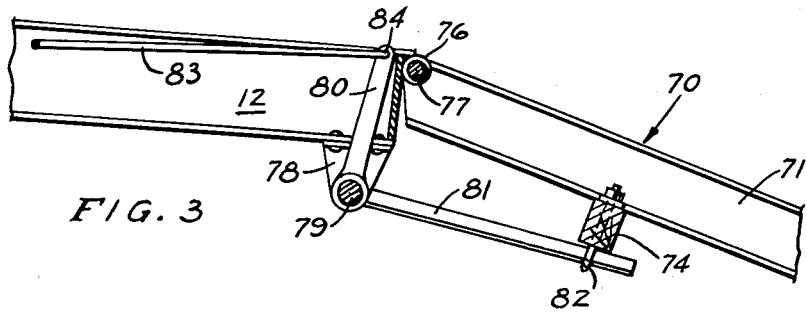
FIG. 3
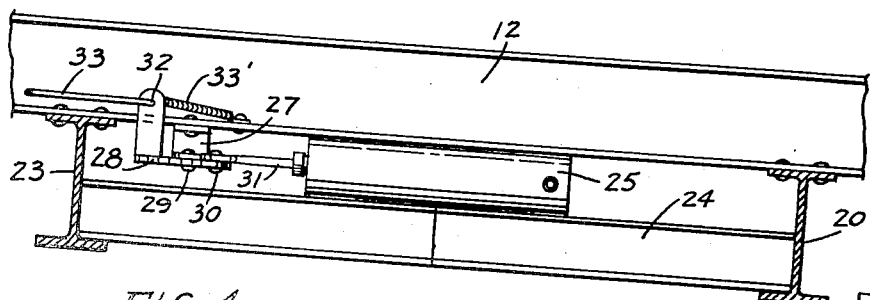
FIG. 4
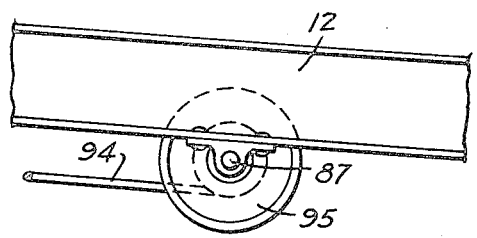
FIG. 5
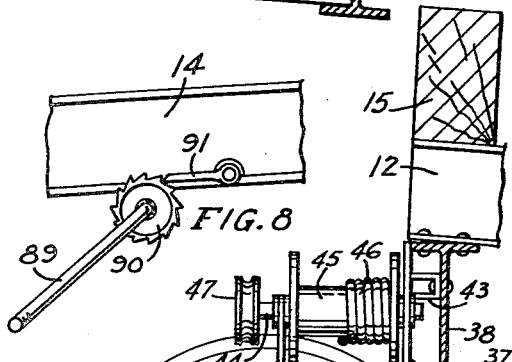
FIG. 8
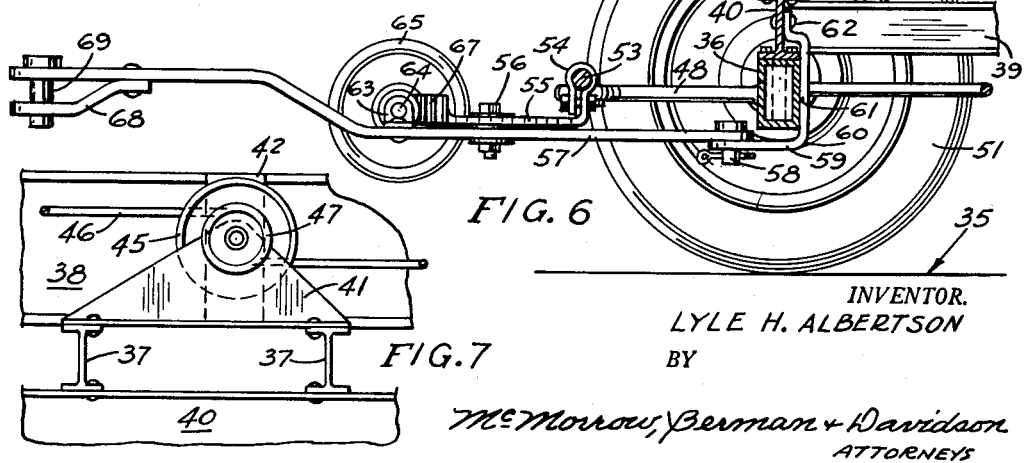
FIG. 6
FIG. 7
INVENTOR.
LYLE H. ALBERTSON
BY
McMorrow, Berman & Davidson
ATTORNEYS

United States Patent Office 2,756,882
Patented July 31, 1956

2,756,882

HAY STACK LOADER VEHICLE

Lyle Hudson Albertson, Hecla, S. Dak.

Application October 1, 1954, Serial No. 459,637

3 Claims. (Cl. 214—85.1)

This invention relates to improvements in machines for loading and unloading material such as hay and the like, and more particularly to a novel machine for loading, transporting, and unloading a hay stack.

The primary object of the invention is to provide an efficient and practical device of the character indicated above, to be operated by a tractor, whereby a hay stack can be quickly and easily picked up as a unit, carried to another location, and unloaded at such other location.

Another important object of the invention is the provision of a device of the character indicated above which comprises manual means whereby the loading fork of the machine can be positioned in lowered position and in elevated position, and winch means, operated from a power take-off of an associated tractor, for moving a hay stack onto and off the machine.

A further important object of the invention is to provide a device of the character indicated above which is comparatively simple in construction, and can be made in a rugged, serviceable, and attractive form at relatively low cost.

Other important objects and advantageous features of the invention will be apparent from the following description and the accompanying drawings, wherein, for purposes of illustration only, a specific embodiment of the invention is set forth in detail.

Figure 1:
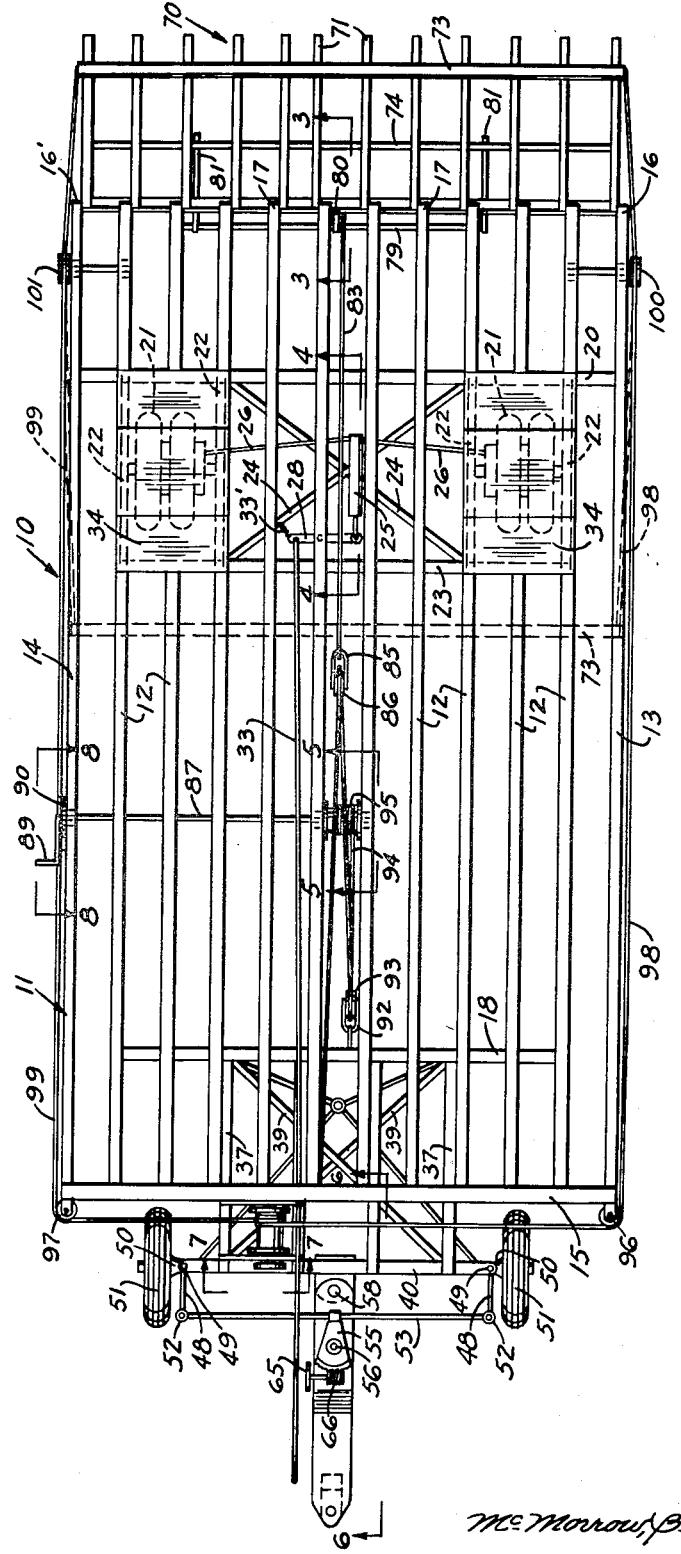
Figure 1 is a top plan view.

Figures 3, 4 and 5 are enlarged fragmentary vertical longitudinal sections taken on the lines 3—3, 4—4 and 5—5 of Figure 1;

Figure 6 is an enlarged fragmentary vertical longitudinal section taken on the line 6—6 of Figure 1;

Figure 7 is a fragmentary and enlarged front elevation viewed along the line 7—7 of Figure 1; and Figure 8 is an enlarged fragmentary side elevation viewed along the line 8—8 of Figure 1.

Referring in detail to the drawings, wherein like numerals designate like parts throughout the several views, the illustrated hay stack mover, generally designated 10, comprises an elongated rectangular flat frame or platform 11 having a plurality of relatively closely spaced parallel longitudinal members 12 located between longitudinal side members 13 and 14. A front hay stack stop member 15 extends between the side members 13 and 14 and is fixed to their front ends and to the front ends of the members 12 on the upper sides of these members.

The side members 13 and 14 terminate in free rear ends 16 and 16', respectively, which are aligned with the free rear ends 17 of the members 12.

A front cross brace 18 is spaced rearwardly from the front cross member 15 and is secured to the undersides of the members 12.

A rear cross brace 20 is spaced forwardly from the free rear ends of the side members 13 and 14 and members 12.

Wheel supporting framework is located between and forwardly of the cross brace 20 and comprises similar dual wheel sets 21, 21 mounted in rectangular frames 22, 22 fixed to the undersides of member 12, the frames 22, 22 being connected by a front transverse brace 23 and by crossed diagonal braces 24, 24.

Fixed on the diagonal braces 24, 24, as shown in Figure 4 is a hydraulic brake master cylinder 25, having brake lines 26, 26 leading to the dual wheel sets.

A bracket 27 is fixed to the underside of an adjacent frame member 12, as shown in Figure 4, and a lever 28 is pivoted at a point intermediate its ends, as indicated at 29, to the bracket 27. The lever 28 has one end pivoted at 30 to the master cylinder piston rod 31. The other end of the lever 28 is pivoted at 32 to the rear end of a longitudinal brake applying rod 33 which extends forwardly along and beyond the front end of the frame 11 for connection to an operating lever on an associated tractor (not shown) to be controlled by the driver of the tractor. A brake releasing spring 33' is stretched between the adjacent end of the lever 28 and one of the diagonal braces 24.

Protective hoods 34 secured to the top of the frame 11 cover the dual wheel sets 21, 21.

The frame 11 is supported at a slight rearward declining angle relative to the ground 35 by the dual wheel sets 21, 21 and by a forward wheel suspension which comprises a stationary axle 36 fixed to the undersides of the forward ends of longitudinal arms 37 which are fixed at their rearward ends to the underside of the front cross brace 18, and are fixed at intermediate points to the underside of a cross member 38, which in turn is fixed to the underside of the front ends of the longitudinal frame members 12.

Diagonal braces 39 extend between the cross brace 18 and the transverse member 40 which is fixed to the top of the axle 36 and secured directly to the undersides of arms 37, as shown in Figure 6.

Upright front and rear brackets 41 and 42, respectively, are secured on the tops of arms 37, at the right of center of the frame 11, the rear bracket 42 being also secured to the cross member 38, as indicated at 43. A winch shaft 44 is journaled in the brackets 41 and 42 and has a cable drum 45 thereon between the brackets, on which is wound a cable 46. The shaft 44 has a coupling 47 on its forward end for connection to a power take-off (not shown) of an associated tractor (not shown).

Forwardly projecting steering arms 48, 48 are vertically pivoted at 49, 49 on the ends of the axle 36 and include stub axles 50, 50 on which are journaled ground-engaging wheels 51, 51.

The forward ends of the steering arms 48 are pivoted, as indicated at 52, to the outer ends of transverse drag link 53, which is loosely connected, as indicated at 54, to the rearward end of a sector gear 55.

The sector gear 55 is vertically pivoted, as indicated at 56, upon an elongated flat drawbar 57 which is pivoted, as indicated at 58 to the underside of the horizontal arm 59 of an L-shaped bracket 60, which has an upright arm 61 secured to the rear side of the frame cross member 40, at 62.

Journaled across the drawbar 57 in front of the sector gear 55 in brackets 63 is a worm shaft 64 having a hand wheel 65 on one end, and a worm 66 meshed with the teeth 67 of the sector gear 55. The hand wheel 65 is adapted to be manually turned to turn the wheels 51, 51 to steer the device into engagement with a hay stack to be loaded.

The drawbar 57 has a clevis 68 on its forward end traversed by a vertical coupling pin 69, arranged for connection to the drawbar of an associated tractor (not shown).

Pivoted on a transverse horizontal axis on the rear end of the frame 11 is the loading fork 70 which comprises laterally spaced longitudinal tines 71 paralleling the outer frame side members 13 and 14 and the longitudinal frame members 12.

Figure 2:
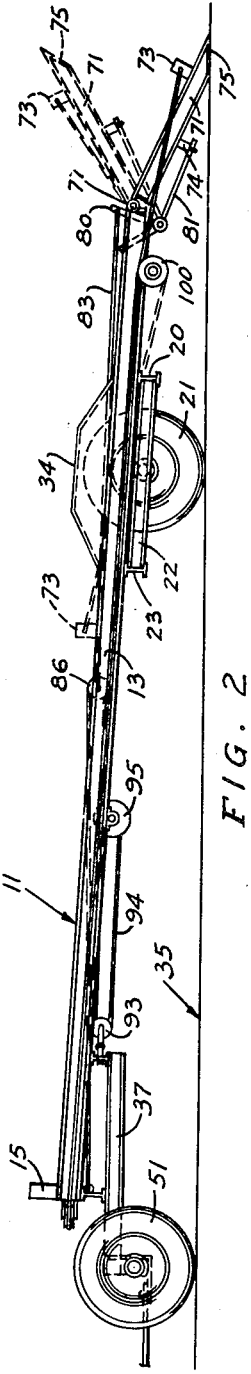
Figure 2 is a left hand side elevation with the loading fork in lowered position in full lines and in elevated position in phantom lines.

A forward cross member 74 secured to the bottom of the tines 71 is spaced forwardly from the rear ends of the tines. The rear ends of the tines are beveled on their undersides, as indicated at 75, to provide for flush engagement of the tines 71 with the ground 35 when in depressed position, as shown in Figure 2.

Journal eyes 76 are secured to the rear ends of the frame side members 13 and 14 and frame longitudinal members 12, and a loading fork shaft 77, secured to the forward ends of the tines 71 is journaled through the eyes 76 whereby the fork 70 is connected to the frame 11 to swing upwardly and downwardly out of the plane of the frame 11.

Brackets 78 are secured to and depend from the rear end of two adjacent frame members 12, and journaled therein is a transverse fork operating shaft 79. The shaft 79 has at its middle a short vertical lever arm 80 and near its ends longer horizontal lever arms 81. The lever arms 81 are engaged under the forward fork cross member 74 and are secured thereto, as indicated at 82.

A longitudinal rod 83, positioned above the frame 11, is pivoted at its rearward end to the upper end of the lever arm 80, as indicated at 84, and has a clevis 85 on its forward end carrying a pulley 86, located just forward of the frame cross member 19.

Spaced forwardly of the pulley 86 is a transverse drum shaft 87 journaled in brackets 88 secured to the undersides of frame members 12, and the shaft 87 terminates outwardly of the frame side member 14 in a crank handle 89. A ratchet wheel 90 is fixed on the shaft 87 next to the crank handle 89, and a ratchet dog 91 is pivoted on the outer side of the frame side member 14 and is engaged with the teeth of the ratchet wheel 90.

In line with the pulley 86 is a clevis 92 carrying a pulley 93, the clevis 92 being secured to the frame cross member 18. A cable 94 has one end thereof secured to and wound around a drum 95 fixed on the shaft 87 in line with the pulleys 86 and 93. The cable 94 leads forwardly from the drum 95, is trained upwardly around the pulley 93 and led rearwardly from the pulley 93 and trained downwardly around the pulley 86 and secured to the frame 11. With this arrangement, manual rotation of the crank handle 89 in one direction elevates the loading fork 70, as indicated in phantom lines in Figure 2; and rotation of the crank handle 89 in the opposite direction, with the ratchet dog 91 disengaged from the ratchet wheel 90, permits the fork 70 to subside to its depressed position, as shown in full lines in Figure 2.

The above mentioned cable 46 has an intermediate portion thereof wound around the winch drum 45 and trained rearwardly around pulleys 96 and 97 secured to the forward corners of the frame 11. The flights 98 and 99 of the cable 46 extending rearwardly along the outer sides of the frame side members 13 and 14, respectively, are trained around pulleys 100 and 101, respectively, which are mounted on the frame side members 13 and 14 near their rearward ends 16, and the rear ends of the flights 98 and 99 are secured to the ends of a transversely extending push bar 73 which rides freely upon the top of the frame 11, for pushing a hay stack rearwardly off the frame 11 when the winch drum 45 is operated in the appropriate direction, the bar 73 having first been placed in front of the hay stack, with the fork 70 in depressed position. The bar 73 placed behind a hay stack on the frame 11 can be pulled forwardly thereon by operating the winch 45 in the opposite direction with the bar 73 behind the hay stack.

What is claimed is:

1. In a machine for loading, transporting, and unloading a hay stack relative to the ground, a flat horizontally elongated frame having a front end and a rear end, fixed rear ground-engaging wheel means depending from said frame near its rear end, a front steerable ground-engaging wheel suspension including a tractor-engaging drawbar, a loading fork pivoted on and extending rearwardly beyond the rear end of said frame to swing on a horizontal transverse axis relative to said frame from a downwardly angulared depressed ground-engaging position to an upwardly inclined elevated position relative to the plane of said frame, powered stack moving means comprising a power winch on the front end of said frame including a cable drum and a coupling on the drum for connection to a power take-off of an associated tractor, and winch cable means wound on said winch drum, said cable means including flights having rear ends, and a transverse stack pushing bar riding freely upon said frame and connected at its ends to the rear ends of the cable flights, and manual fork operating means comprising a transverse shaft journaled on a forward part of the machine frame, a drum fixed on the transverse shaft, a crank handle on one end of the transverse shaft, a ratchet wheel fixed on the transverse shaft, a ratchet dog pivoted on the frame and normally engaging the ratchet wheel, a fork operating shaft journaled transversely on the rear end of the frame, said fork operating shaft having an upright lever arm and a horizontal lever arm, said horizontal lever arm being connected to said loading fork, and cable and pulley means on said frame and associated with the transverse shaft drum and connected to said upright lever arm.

2. In a machine for loading, transporting, and unloading a hay stack relative to the ground, a flat horizontally elongated frame having a front end and a rear end, fixed rear ground-engaging wheel means depending from said frame near its rear end, a front steerable ground-engaging wheel suspension including a tractor-engaging drawbar, a loading fork pivoted on and extending rearwardly beyond the rear end of said frame to swing on a horizontal transverse axis relative to said frame from a downwardly angulated depressed ground-engaging position to an upwardly inclined elevated position relative to the plane of said frame, means for operating said fork, powered stack moving means comprising a power winch on the front end of said frame including a cable drum and a coupling on the drum for connection to a power take-off of an associated tractor, and winch cable means wound on said winch drum, said cable means including flights having rear ends, a transverse pusher bar riding freely upon said frame and connected at its ends to the rear ends of the cable flights, said rear ground-engaging wheel means comprising laterally spaced sets of wheels, hydraulic brakes associated with each wheel set, a hydraulic brake master cylinder mounted on the frame between the sets having brake lines severally connected to the brakes, said master cylinder having a piston, a lever pivoted intermediate its ends on the frame and pivotally connected at one end to said piston, retracting spring means acting between the frame and the other end of the lever, and an operating rod extending along the frame, said operating rod having a rear end pivoted to said other end of the lever and having a forward end reaching forwardly beyond the front end of the frame for operation from an associated tractor.

3. In a machine for loading, transporting, and unloading a hay stack relative to the ground, a flat horizontally elongated frame having a front end and a rear end, fixed rear ground-engaging wheel means depending from said frame near its rear end, a front steerable ground-engaging wheel suspension including a tractor-engaging drawbar, a loading fork pivoted on and extending rearwardly beyond the rear end of said frame to swing on a horizontal transverse axis relative to said frame from a downwardly angulated depressed ground-engaging position to an upwardly inclined elevated position relative to the plane of said frame, means for operating said fork, powered stack moving means comprising a power winch on the front end of said frame including a cable drum and a coupling on the drum for connection to a power take-off of an associated tractor, and winch cable means wound on said winch drum, said cable means including flights having rear ends, a transverse push bar riding freely upon said frame and connected at it's ends to the rear ends of the cable flights, said steerable wheel suspension comprising a transverse stationary axle, longitudinal arms projecting forwardly from the front end of the frame and secured to the frame, said arms having forward ends to which the axle is fixed, steering arms having rear ends pivoted on vertical axes to opposite ends of said axle, said steering arms having stub axles on which front ground-engaging wheels are journaled, a drag line pivoted at opposite ends to said steering arms, said drawbar comprising a rear member fixed to said axle and a forward member pivoted to the rear member, a sector gear pivoted on said forward drawbar member, a worm shaft mounted on said forward member and meshed with said sector gear, means loosely connecting said sector gear with said drag link, and manual means for rotating the worm shaft to steer the front wheels.

References Cited in the file of this patent

UNITED STATES PATENTS

| | | |
|---|---|---|
| 2,121,153 | Konicek | June 21, 1938 |
| 2,173,277 | Jarmin et al. | Sept. 19, 1939 |
| 2,316,702 | McDaniel | Apr. 13, 1943 |
| 2,411,183 | Baldwin | Nov. 19, 1946 |